(12) United States Patent
Meisser et al.

(10) Patent No.: US 10,650,244 B2
(45) Date of Patent: *May 12, 2020

(54) VIDEO CONFERENCING SYSTEM AND RELATED METHODS

(71) Applicant: Logitech Europe S.A., Lausanne (CH)

(72) Inventors: Mathieu Meisser, Lutry (CH); Remy Zimmermann, Pully (CH); Mario Arturo Gutierrez Alonso, Renens (CH); David Guhl, Preverenges (CH); Nicolas Sasselli, Belmont-sur-Lausanne (CH); Jean-Christophe Hemes, Champagne (CH); Stephane Delorenzi, Lausanne (CH); Ali Moayer, Castro Valley, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,503

(22) Filed: Apr. 26, 2019

(65) Prior Publication Data

US 2019/0251362 A1     Aug. 15, 2019

Related U.S. Application Data

(63) Continuation of application No. 15/713,402, filed on Sep. 22, 2017, now Pat. No. 10,360,457, which is a
(Continued)

(51) Int. Cl.
*H04N 7/15* (2006.01)
*G06K 9/00* (2006.01)
(Continued)

(52) U.S. Cl.
CPC ..... *G06K 9/00744* (2013.01); *H04N 5/23206* (2013.01); *H04N 5/23293* (2013.01);
(Continued)

(58) Field of Classification Search
CPC .... H04N 7/181; H04N 5/23293; H04N 5/247; H04N 7/15; H04N 7/147; H04N 5/23206;
(Continued)

(56) References Cited

U.S. PATENT DOCUMENTS 5,434,617 A   7/1995 Bianchi
6,392,694 B1  5/2002 Bianchi
(Continued)

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.
(Continued)

*Primary Examiner* — Melur Ramakrishnaiah
(74) *Attorney, Agent, or Firm* — Patterson & Sheridan, LLP (57) ABSTRACT

A computer implemented method includes extracting one or more portions from a first video stream of a first physical environment; transmitting captured video data via a first communication link to one or more electronic display devices disposed within a second physical environment, wherein the captured video data includes the one or more extracted portions and the captured video data includes a preview portion that includes a first portion of a frame of the first video stream; and transmitting a second video stream of a second field of view of the first physical environment to at least one of the one or more electronic display devices disposed within the second physical environment via a second communication link, wherein the second video stream is generated in response to a selection of the preview portion of the captured video data made by a user located in the second physical environment.

21 Claims, 5 Drawing Sheets

Related U.S. Application Data continuation of application No. 15/376,228, filed on Dec. 12, 2016, now Pat. No. 9,798,933.

(51) Int. Cl.
*H04N 7/18* (2006.01)
*H04N 5/232* (2006.01)
*H04N 5/247* (2006.01)
*H04N 7/14* (2006.01)

(52) U.S. Cl.
CPC ............ *H04N 5/247* (2013.01); *H04N 7/147* (2013.01); *H04N 7/15* (2013.01); *H04N 7/181* (2013.01); *H04N 5/23216* (2013.01); *H04N 5/23296* (2013.01)

(58) Field of Classification Search
CPC ........... H04N 5/23216; H04N 5/23296; G06K 9/00744
USPC ............................................ 348/14.01–14.16
See application file for complete search history.

(56) References Cited

U.S. PATENT DOCUMENTS

| | | |
|---|---|---|
| 6,611,281 B2 | 8/2003 | Strubbe |
| 6,731,334 B1 | 5/2004 | Maeng et al. |
| 6,829,391 B2 | 12/2004 | Comaniciu et al. |
| 7,349,008 B2 | 3/2008 | Rui et al. |
| 7,433,327 B2 | 10/2008 | Harville et al. |
| 7,746,401 B2 | 6/2010 | Wu et al. |
| 7,940,432 B2 | 5/2011 | Shih et al. |
| 8,094,193 B2 | 1/2012 | Peterson et al. |
| 8,237,764 B1 | 8/2012 | Chen et al. |
| 8,284,254 B2 | 10/2012 | Romanowich et al. |
| 8,358,328 B2 | 1/2013 | Friel et al. |
| 8,368,752 B2 | 2/2013 | Lin et al. |
| 8,471,889 B1 | 6/2013 | Lee et al. |
| 8,547,414 B2 | 10/2013 | Sheeley |
| 8,659,638 B2 | 2/2014 | Chao et al. |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,237,307 B1 | 1/2016 | Vendrow |
| 9,270,941 B1 | 2/2016 | Lavelle |
| 9,338,395 B2 | 5/2016 | Wang et al. |
| 2002/0106137 A1 | 8/2002 | Chen et al. |
| 2004/0003409 A1 | 1/2004 | Berstis |
| 2007/0024706 A1 | 2/2007 | Brannon et al. |
| 2009/0174530 A1 | 7/2009 | Yen et al. |
| 2011/0050843 A1 | 3/2011 | Cheng et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2011/0161836 A1 | 6/2011 | Mu et al. |
| 2012/0019611 A1 | 1/2012 | Wu et al. |
| 2012/0169883 A1 | 7/2012 | Chang et al. |
| 2012/0223960 A1 | 9/2012 | Chiang et al. |
| 2012/0268626 A1 | 10/2012 | Lu et al. |
| 2013/0194378 A1* | 8/2013 | Brown .................... H04N 7/152 348/14.09 |
| 2013/0242037 A1* | 9/2013 | George .................. G06F 1/3203 348/14.12 |
| 2013/0329003 A1 | 12/2013 | Hsia et al. |
| 2013/0335508 A1 | 12/2013 | Mauchly |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0111600 A1 | 4/2014 | Schaefer et al. |
| 2014/0313346 A1 | 10/2014 | Huang et al. |
| 2015/0022636 A1 | 1/2015 | Savransky |
| 2016/0057385 A1 | 2/2016 | Burenius |
| 2016/0073055 A1 | 3/2016 | Marsh |
| 2016/0173818 A1* | 6/2016 | Su ............................ H04N 7/15 348/14.07 |
| 2016/0173821 A1 | 6/2016 | De Magalhaes |
| 2016/0286166 A1 | 9/2016 | Sandvik et al. |
| 2016/0291861 A1 | 10/2016 | Song et al. |
| 2016/0295128 A1 | 10/2016 | Schnittman |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

Tips for Having a Great Conference. Aver HD Video Conferencing. http://www.averusa.com/video-collaboration/support/video-conferencing-tips.asp. 1991-2015.

VC320. Portable USB Video Conferencing Camera System for Small and Huddle Rooms. 2016.

EVC Series. Meeting collaboration made easy and affordable. http://www.averusa.com/video-collaboration/products/evc-series-video-conferencing.asp. 1991-2015.

AVer VCLink & ScreenShare. http://www.averusa.com/video-collaboration/products/vank-and-screenshare.asp. 1991-2015.

Portable USB Video Conference Camera System for Small and Huddle Rooms. 1991-2015.

Plug-N-Play USB Video Conference Camera System for Mid to Large Rooms. http://www.averusa.com/video-collaboration/products/vc520-usb-conference-camera.asp. 1991-2015.

Embedded 10-site HD MCU with built-in 18x PTZ Video Conferencing Endpoint. http://www.averusa.com/video-collaboration/products/evc910.asp. 1991-2015.

How to Cut to Different Shots. https://help.getmevo.com/hc/en-us/articles/223725908-How-to-Cut-to-Different-Shots. Sep. 27, 2016.

Enable Face Detection. https://help.getmevo.com/hc/en-us/articles/224041827-Enable-Face-Detection. Sep. 27, 2016.

Edit on the fly. https://getmevo.com/mevoapp. Downloaded Dec. 12, 2016.

So many ways to share. https://getmevo.com/sharing. Downloaded Dec. 12, 2016.

* cited by examiner

VIDEO CONFERENCING SYSTEM AND RELATED METHODS

CROSS-REFERENCE TO RELATED APPLICATIONS

This application is a continuation of co-pending U.S. patent application Ser. No. 15/713,402, filed on Sep. 22, 2017, which is a continuation of U.S. patent application Ser. No. 15/376,228, filed on Dec. 12, 2016, both of which are herein incorporated by reference.

BACKGROUND

Field

Embodiments of the present disclosure generally relate to a video conferencing system and related methods of using the video conferencing system described herein.

BACKGROUND

Description of the Related Art

Video conferencing has become more popular in recent years, thanks in large part to proliferation of high speed Internet and price reductions in camera equipment. For example, dedicated video conferencing locations exist where rooms and technological resources are dedicated solely to the task of video conferencing. In video conferencing environments that include multiple camera devices, the video streams of the various cameras can be switched to the video stream of the camera that is most relevant at a given time during the conference. Switching between various cameras requires up to date information of what each camera is currently viewing. In some embodiments, multiple video streams from a first video conferencing location can be sent to users at a second video conferencing location that is remote from the first video conferencing location. Sending multiple video streams to a remote location can be challenging when Internet bandwidth is limited. To overcome limited bandwidth, the quality of the video streams can be decreased, but the decreased quality of the video streams reduces the quality of the video conference. Another option to overcome the limited bandwidth situation is to have the users at the first video conferencing location switch the video stream that is sent to the second video conferencing location, but this option distracts the user at the first video conference location. Furthermore, the user at the second video conferencing location would be better suited to have control of what that user would like to see as opposed to the user at the first video conferencing location.

Therefore, there is a need for a video conferencing system and method of using the same that solves the problems described above.

SUMMARY

Embodiments of the present disclosure generally relate to a video conferencing system and related methods of using the video conferencing system described herein. The video conferencing system and related methods disclosed herein will improve the experience for attendees of a video conference by allowing users at a remote location to adjust the view of the video being streamed to them without consuming excessive bandwidth. The users at each video conference location can receive preview images of different portions of the other video conference location. The preview images consume significantly less bandwidth than the primary video conference stream because the preview images are updated less frequently or are of a reduced file size (e.g., thumbnail video or pictures). Thus, the disclosed video conference system enables remote users the ability to select the view of the video being streamed to them while also enabling the highest quality video to be used for the primary video conference stream. The preview images can be easily transferred to one or more remote locations due at least in part to the low amount of available bandwidth consumed by the preview images.

In one embodiment, a computer implemented method is provided. The method includes extracting one or more portions from a first video stream of a first physical environment; transmitting first captured video data via a first communication link to one or more electronic display devices disposed within a second physical environment that is remote from the first physical environment, wherein the first captured video data includes or is derived from the one or more extracted portions and the first captured video data includes a first preview portion that includes at least a first portion of a frame of the first video stream; and transmitting a second video stream of a second field of view of the first physical environment to at least one of the one or more electronic display devices disposed within the second physical environment via a second communication link, wherein the second video stream is generated in response to a selection of the first preview portion of the first captured video data made by a user located in the second physical environment.

In another embodiment, a computer implemented method is provided. The method includes receiving, at a first controlling device, a first video stream from a first camera, wherein the first camera has a first field of view of a first physical environment, receiving, at the first controlling device, a second video stream from a second camera, wherein the second camera has a second field of view of the first physical environment, extracting one or more portions from the received first video stream, transmitting first captured video data via a first communication link to one or more display devices disposed within a second physical environment that is remote from the first physical environment, wherein the first captured video data includes or is derived from the one or more extracted portions and the first captured video data includes a first preview portion that includes at least a first portion of a frame of the first video stream, transmitting the second video stream to at least one of the one or more electronic display devices disposed within the second physical environment via a second communication link, receiving, by the first controlling device, a first command, wherein the first command is derived from a selection of the first preview portion of the first captured video data made by a user located in the second physical environment, altering the second video stream based on the received first command; and transmitting the altered second video stream to at least one of the one or more electronic display devices electronic display devices disposed within the second physical environment via the second communication link.

In another embodiment, a computer implemented method is provided. The method includes receiving, at a first controlling device, a first video stream from a first camera, wherein the first camera has a first field of view of a first physical environment, receiving, at the first controlling device, a second video stream from a second camera, wherein the second camera has a second field of view of the first physical environment, extracting one or more portions from the received first video stream, transmitting first captured video data via a first communication link to one or more display devices disposed within a second physical environment that is remote from the first physical environment, wherein the first captured video data includes or is derived from the one or more extracted portions and the first captured video data includes a first preview portion that includes at least a first portion of a frame of the first video stream, transmitting the second video stream to at least one of the one or more electronic display devices disposed within the second physical environment via a second communication link; receiving, by the first controlling device, a first command, wherein the first command is derived from a selection of the first preview portion of the first captured video data made by a user located in the second physical environment, altering the first video stream by adjusting the first field of view of the first physical environment based on the received first command or altering the second video stream by adjusting the second field of view of the first physical environment based on the received first command; and transmitting the altered first video stream or the altered second video stream to at least one of the one or more electronic display devices electronic display devices disposed within the second physical environment via the second communication link.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a video conferencing system and related methods of using the video conferencing system described herein. The embodiments of the video conferencing system and related methods disclosed herein improves the experience for the users of a video conferencing system by offering users at a first location updated selections of multiple views of a corresponding second location of the video conference without consuming an excessive amount of bandwidth and allowing the users to control the video conference information received at their location. For example, each video conference location can transmit a high quality video stream of a selected view (e.g., a view of the current speaker) of that video conferencing environment that can be used as the primary means of communication for the video conference. Additionally, each video conference location can also transmit preview images (e.g., thumbnails) of non-selected views (e.g., users that are not currently speaking or other portions of the given video conference environment, such as a whiteboard) of that video conference environment. In some embodiments, these preview images of the non-selected views are of reduced quality and/or a reduced frame rate relative to the high quality video stream of the selected view, allowing for the exchange of these images between the different video conferencing locations to consume significantly less bandwidth relative to a conventional video conferencing system that exchanges high quality video data streams of multiple views at each video conferencing location. Despite this reduced bandwidth, functionality is not sacrificed because the users at a given video conferencing location have access to updated images that allow them to select the view of their choice at any time during the video conference. Furthermore, the reduced bandwidth for exchanging the non-selected views allows the video conferencing system to selectively deliver a single high quality video data stream that is used as the primary means of communication for the video conference based on input from a user, and thus reduces the need for a more complex video conferencing system and/or data transmission infrastructure found in conventional video conferencing systems. Thus, the embodiments of video conferencing systems disclosed herein enhance functionality without sacrificing quality. Although the embodiments described herein are generally described as receiving, at each video conferencing location, a single high quality video data stream that is used as the primary means of communication for the video conference, in some embodiments two or more high quality video data streams can be received at each video conferencing location in addition to the preview images (e.g., thumbnails) of non-selected views.

Figure 1A:
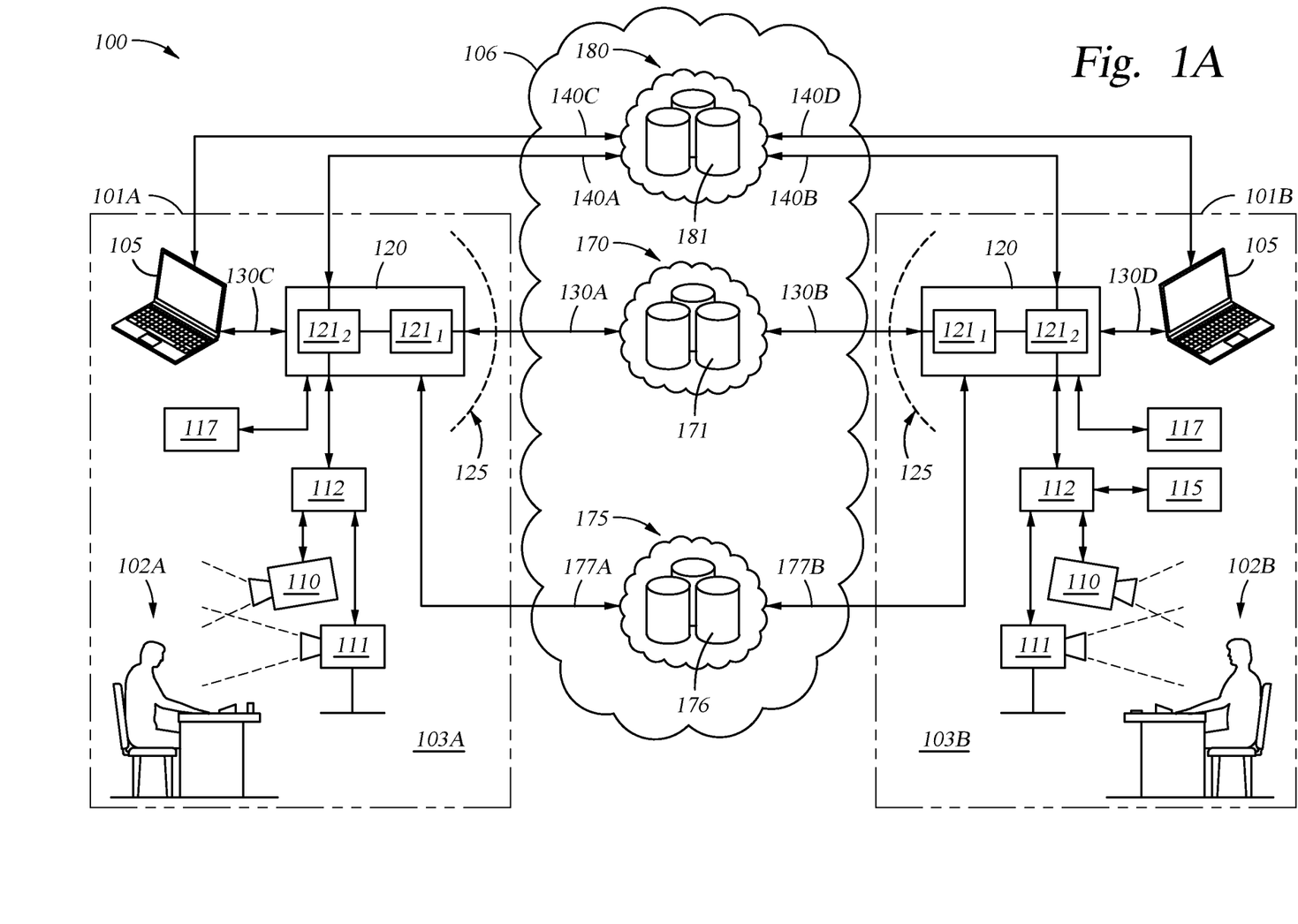
FIG. 1A is a diagram of a video conferencing system, according to one embodiment.

FIG. 1A is a diagram of a video conferencing system 100, according to one embodiment. The video conferencing system 100 includes a first video conferencing endpoint 101A (i.e., the first video conferencing environment 103A and related equipment) and a second video conferencing endpoint 101B (i.e., the second video conferencing environment 103B and related equipment). The related equipment at each respective endpoint 101A, 101B can include one or more cameras, at least one microphone, at least one electronic device for providing the video conference stream from the other video conference endpoint 101A, 101B to the users, and at least one controlling device for handling the distribution of the different types of data exchanged between the respective endpoints 101A, 101B. The related equipment for each respective endpoint 101A, 101B is described in more detail below.

The second video conferencing endpoint 101B is at a remote location relative to the first video conferencing endpoint 101A. A remote location can be any location where it would not be feasible for an attendee at the remote location of the video conference to communicate to an attendee at the other location without the use of external device (e.g., an electronic device, such as a smart phone, tablet, laptop, microphone, etc.). Thus, in some embodiments, a second location can be remote from a first location if the second location is (1) in another building relative to the first location, (2) another room within the same building as the first location, or (3) even in the same room as the first location if it is not feasible for two of the attendees to communicate without use of an external device. The first video conferencing endpoint 101A can be connected to the second video conferencing endpoint 101B through a network 106. The network 106 generally represents any data communications network suitable for the transmission of video and audio data (e.g., the Internet).

The video conferencing system 100 enables the first video conferencing endpoint 101A to communicate with the second video conferencing endpoint 101B through a variety of paths. For example, video conferencing data (e.g., video and audio data) can be exchanged through a video conferencing cloud service 170 (e.g., Microsoft® Skype®). The video conferencing cloud service 170 can include a video conferencing node 171 to allow one or more users 102A located at the first video conferencing endpoint 101A to communicate with one or more users 102B located at the second video conferencing endpoint 101B in a video conference.

Furthermore, status signals and control signals can be exchanged between the respective endpoints 101A, 101B through an operational cloud service 180 that includes an operational cloud server 181. The status signals can include preview images of non-selected portions of the respective video conference environments 103A, 103B. The non-selected portions of the respective video conference environments 103A, 103B can include, for example, preview images of users who have not spoken recently in the video conference, an overview of one of the video conferencing environments 103A, 103B, or an external object or device (e.g., a whiteboard). The control signals can be used to adjust the video conference data that is streamed between the respective endpoints 101A, 101B. For example, a user 102A at the first video conferencing endpoint 101A can send a signal to the second video conferencing endpoint 101B to adjust the video conferencing stream (e.g., change the view) that is transmitted from the second video conferencing endpoint 101B to the first video conferencing endpoint 101A.

Additionally, auxiliary data can also be exchanged between the respective endpoints 101A, 101B through an auxiliary cloud service 175 that includes an auxiliary cloud server 176 to further enhance the interaction between the users 102A, 102B at the respective endpoints 101A, 101B. This auxiliary data can include any data exchanged between the respective endpoints 101A, 101B that is not the video conferencing streams or data transmitted through the operational cloud service. For example, auxiliary data can include data related to instant messaging applications, screen sharing applications, or electronic document sharing applications. Although the video conference system 100 shows three separate cloud services 170, 175, 180, in some embodiments the functions of two or more of these cloud services can be incorporated into one cloud service (e.g., one server) or further divided into more than three cloud services. In some embodiments, communication with any external device on the network 106 occurs through a firewall 125, which is designed to block unauthorized incoming access while permitting outward communication to one or more of the cloud services 170, 175, 180 or devices at the opposing endpoint 101A, 101B.

As mentioned above the related equipment for the endpoints 101A, 101B can include cameras, microphones, display devices, and controlling devices. For example, each video conferencing endpoint 101A, 101B includes a wide-angle camera device 110 (first camera), a pan and tilt camera device 111 (second camera) (e.g., a pan, tilt, and zoom camera), one or more microphones 117, a controlling device 120, and an electronic display device 105 (e.g., a laptop, personal computer, tablet, smart phone etc.). In some embodiments, the electronic display device 105 or the controlling device 120 can transmit the incoming video conferencing stream to a larger display device, such as a television, monitor, or projection screen. The video conference endpoints 101A, 101B may further include other electronic devices that may be used in the video conference, such as an electronic whiteboard 115 shown at the second video conference endpoint 101B. In other embodiments, a non-electronic whiteboard (not shown) may be included, and one of the camera devices 110, 111 may be used to record and stream the contents of the non-electronic whiteboard to the users at the other video conference endpoint 101A, 101B.

Generally, the wide-angle camera device 110 is configured to capture a video stream of a given physical environment, and preferably is positioned so that all users within the given physical environment are depicted within the captured video stream. In some embodiments, the pan and tilt camera device 111 is capable of adjusting the orientation of a camera sensor within the pan and tilt camera device 111 across multiple degrees of freedom. Additionally, the pan and tilt camera device 111 may be capable of zoom functionality, such as a hardware zoom or software zoom.

In some embodiments, the wide-angle camera device 110 can be a camera device that lacks at least some of the functionality of the pan and tilt camera device 111, such as a camera device that does not include panning or tilting functionality. In such embodiments, the wide-angle camera device 110 can be used to generate preview images of the physical environment for sending to the other video conference endpoint 101A, 101B. Furthermore, in such embodiments, the pan and tilt camera device 111 can pan, tilt, and or zoom during the video conference to provide the user(s) at the remote location their desired view of the video conference endpoint 101A, 101B that is remote from them. In other embodiments, the camera devices 110, 111 can be identical camera devices. For example, in one embodiment, each camera device 110, 111 can be a camera with pan, tilt, and zoom functionality, and in these embodiments either camera device 110, 111 can perform the functions of either of the other camera devices 110, 111 described herein.

In some embodiments of the video conference system 100, only one camera device is used. In such embodiments, the single camera device may record an overview of the video conference environment and transmit a selected portion of the recorded overview (e.g., a portion focused on a single user) when a view of a portion is more suitable to transmit to the opposing video conference endpoint 101A, 101B than a video stream of the overview, such as when a single user is speaking continuously for a long time during the video conference. In one example, the wide-angle camera device 110 is a device that has a high enough image resolution so that it can desirably provide a digital zoom of sub-portions of its field-of-view. Conversely, in other embodiments three or more camera devices may be used to capture additional views that may not be possible with only two camera devices.

The controlling devices 120 of each endpoint 101A, 101B can handle at least some of the communication between endpoints 101A, 101B and can also handle communication with the camera devices 110, 111 of that endpoint 101A, 101B. The controlling device 120 can be a general purpose computer or a custom electronic device configured to execute the tasks described herein as being executed by the controlling device 120. In some embodiments, the controlling device 120 can include at least one controlling processor that can process, control and distribute the various video conference data received from the various camera devices and video streams delivered to or provided from other video conference locations. In some embodiments, the controlling processor within the controlling device 120 may include two independent processing units that may include a first processing unit $121_1$ and a second processing unit $121_2$, so that largely independent tasks can be handled by the separate processing units. For example, in one embodiment the first processing unit $121_1$ handles the processing of exchanging the primary video conference streams (i.e., the video conference streams that the users at the two endpoints 101A, 101B use to communicate during the video conference) between the video conference endpoints 101A, 101B, and the second processing unit $121_2$ can handle the remainder of the tasks executed by the controlling device 120, such as exchanging the control and status signals through the operational cloud server 181 and exchanging auxiliary data through the auxiliary data server 176. Using the two independent processing units can help prevent any interruption to the primary video conference streams during the video conference.

Although the video conference system 100 is described as including a controlling device 120 at each endpoint 101A, 101B, in some embodiments, one or more of the functions executed by the controlling device 120 of a given endpoint 101A, 101B can be executed by the electronic display device 105 of that endpoint 101A, 101B. Furthermore, in some embodiments all of the functions executed by the controlling device 120 of a given endpoint 101A, 101B can be executed by the electronic display device 105 of that endpoint 101A, 101B thus obviating the need for a controlling device 120 at that endpoint 101A, 101B.

The controlling device 120 of a given endpoint 101A, 101B can receive the video streams from each of the camera devices 110, 111 of that endpoint 101A, 101B. In some cases an optional hub 112 (e.g., a Universal Serial Bus "USB" hub) can be placed between the controlling device 120 and the camera devices 110, 111. The controlling device 120 can determine which of the video streams of the camera devices 110, 111 to transmit to the opposing endpoint 101A, 101B. For example, a video conference may begin with the controlling device 120 transmitting the video stream from the wide-angle camera device 110, so that user(s) at the other video conference endpoint 101A, 101B can see an overview of the physical environment (e.g., all of the attendees in a conference room), and then later switch to a video stream transmitted from the pan and tilt camera device 111 that is focused on one individual user who is speaking at that time. The controlling devices 120 of the respective endpoints 101A, 101B can communicate with the video conferencing node 171 of the video conferencing cloud service 170 (e.g., Microsoft® Skype®) through corresponding first and second video conference network links 130A, 130B, so that the video conference streams can be exchanged between the two video conference endpoints 101A, 101B.

The primary video conference stream received at the controlling device 120 from the opposing endpoint 101A, 101B can then be transmitted from the controlling device 120 to an electronic display device 105 allowing the user to view and hear the video conference stream. For example, the controlling device 120 of the first video conference endpoint 101A can transmit the primary video conference stream received from the second video conference endpoint 101B to the electronic display device 105 of the first video conference endpoint 101A through a third video conference network link 130C. Similarly, the controlling device 120 of the second video conference endpoint 101B can transmit the primary video conference stream received from the first video conference endpoint 101A to the electronic display device 105 of the second video conference endpoint 101B through a fourth video conference network link 130D.

The controlling devices 120 of the respective endpoints 101A, 101B can further communicate with the operational cloud server 181 of the operational cloud service 180 through corresponding first and second operational server network links 140A, 140B, so that status signals and control signals can be exchanged between the video conference endpoints 101A, 101B. The status signals can include preview images of portions of the respective video conference environments 103A, 103B. These preview images can include images of the overall conference environment, individuals or portions of the environment that are not depicted in the video stream currently being streamed to the opposing endpoint 101A, 101B through the video conferencing cloud service 170 (e.g., Microsoft® Skype®), or other views, such as a view of an external object relevant to the video conference (e.g., a whiteboard).

In some embodiments, these preview images can be of lower quality than the primary video conference stream, such as having a lower resolution, lower frame rate, or still images that are periodically updated. Thus, here the lower quality of the preview images relative to the primary video conference stream means a significantly lower data transmission rate is required for exchanging the preview images between the endpoints 101A, 101B relative to exchanging the primary video conference streams between the endpoints 101A, 101B. This reduced data transmission rate used for exchanging the preview images allows more of the bandwidth (e.g., Internet bandwidth) to be used for exchanging the primary video conference streams between the endpoints 101A, 101B while still providing remote users access to the preview images that these remote users can use to control and adjust the view for the incoming primary video conference stream that is desired by them at any given time during the video conference. In some embodiments, the lower quality preview images can be transmitted on a lower speed and/or lower cost communication link, such as provided through the cloud service 180 versus the video conferencing cloud service 170, and thus not requiring the video conferencing cloud service 170 to reliably deliver both information streams, as will be discussed further below.

The users can use the electronic display device 105 to select the desired view during the video conference, for example, by selecting the preview image of that view, and in some cases by using additional commands, such as panning, tilting, or adjusting the zoom of the selected view by a camera device. Thus, providing the preview images to the remote user(s) allows the remote user(s) to adjust the view of the incoming primary video conference stream as they see fit without interrupting user(s) at the other video conference endpoint 101A, 101б. In some embodiments, to further increase the bandwidth available to the primary video conference stream transferred via the video conference network links 130A, 130B, the preview images may be transmitted to the opposing video conference endpoint using a separate physical network connection from the primary video conference stream, such as via one or more of operational server network links 140A, 140B, 140C, 104D. For example, in one embodiment the primary video conference stream can be transmitted to the opposing video conference endpoint using a dedicated high speed Internet connection (e.g., a T-1 Line) while the preview images may transmitted over another available Internet connection that does not use the resources of the dedicated high speed Internet connection. In one example, the video conference network links 130A, 130B are configured to deliver data at speeds greater than 5 Mbit/s, or even at speeds greater than 9 Mbit/s. Furthermore, in some examples, the operational server network links 140A, 140B are configured to deliver data at speeds of about 5% to about 25% of the speed of the data delivered by the video conference network links 130A, 130б, such as about 10% of the speed of the data delivered by the video conference network links 130A, 130б.

The controlling devices 120 of the respective endpoints 101A, 101б can further communicate with the auxiliary cloud server 176 of the auxiliary cloud service 175 through corresponding first and second auxiliary data network links 177A, 177B, so that auxiliary data can be exchanged between the two video conference endpoints 101A, 101B. As mentioned above, the auxiliary data can include data related to instant messaging applications, screen sharing applications, or electronic document sharing applications.

Each endpoint 101A, 101B further includes one or more electronic display devices 105 that allows the users at the video conference endpoints 101A, 101B to interact with each other and with the video conference system 100. Each electronic display device 105 allows the user at a given video conference endpoint 101A, 10B to receive the primary video conference stream from the other video conference endpoint 101A, 10B. Each electronic display device 105 can further be used to receive preview images of non-selected portions of the physical environment 103A, 103B of the other video conference endpoint 101A, 101B. These preview images allow the users at a given video conference endpoint 101A, 101B to change the view for the incoming primary video conference stream from the other endpoint 101A, 101B. In some embodiments, the preview images are visible on a portion of the display of the electronic display device 105. In other embodiments, the preview images appear on the display when a user decides to access the preview images.

One or more of the electronic display devices 105 may include, but are not limited to an iPod®, iPhone®, iPad®, Android™ phone, Samsung phone, Samsung Galaxy®, Squeeze™ box, Microsoft Surface®, laptop or other similar device. In some embodiments, an electronic display device 105 may include two or more electronic devices that are capable of performing the function of displaying images received in a video stream delivered from another video conference endpoint (e.g., display device, TV, laptop, tablet, etc.) and a device that is capable of receiving input from a user regarding what view that they want to receive based on the received preview images (e.g., laptop, tablet, keyboard, smart phone, etc.).

When the user selects one of the preview images, a command can be sent to the opposing video conference endpoint 101A, 101B through the operational cloud server 181 using a corresponding third or fourth operational server network link 140C, 140D and one of the first or second operational server network links 140A, 140B. For example, if a user 102A at the first video conference endpoint 101A selects a preview image to receive a different view from the primary video conference stream from the second video conference endpoint 101B, then the command for the selection is transmitted from the electronic display device 105 of the first video conference endpoint 101A to the operational cloud server 181 using the third operational server network link 140C and then the command for the selection is transmitted from the operational cloud server 181 to the controlling device 120 of the second video conference endpoint 101B using the second operational server network connection 140B. The controlling device 120 of the second video conference endpoint 101B can then communicate with one or more of the camera devices 110, 111, so that a video conference stream of the newly selected view can be sent to the first video conference endpoint 101A through the video conference node 171 via the communication links 130A, 130B. In one embodiment the controlling device 120 can receive locational information from the wide-angle camera device 110 for the location of the selected view, and then the controlling device 120 can use the received locational information to provide locational information to the pan and tilt camera device 111. The pan and tilt camera device 111 can then use the provided locational information to make corresponding adjustments to provide the selected view to the controlling device 120, which can then provide the video conference stream of the newly selected view to the electronic display device 105 of the first video conference endpoint 101A.

Figure 1B:
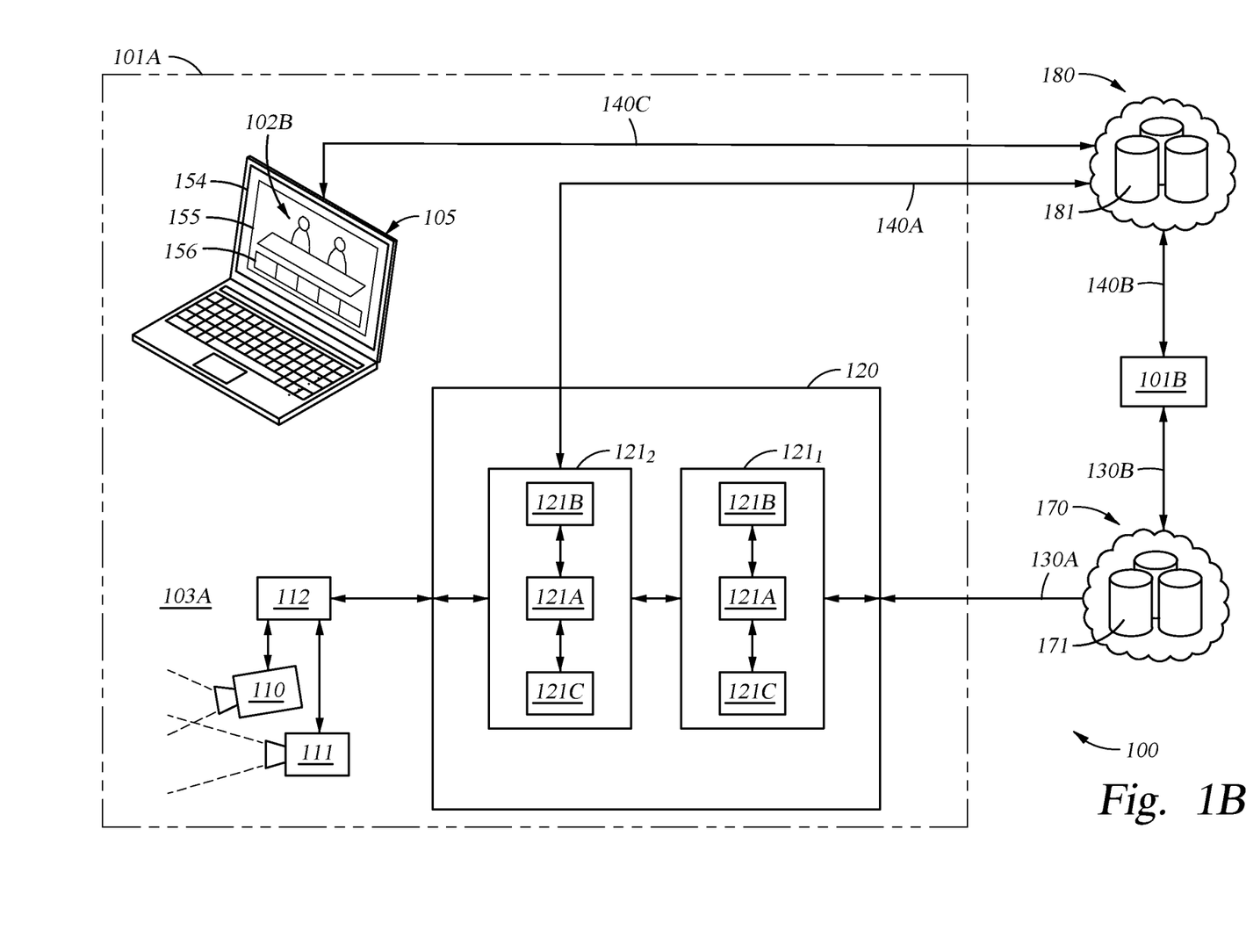
FIG. 1B is a close-up diagram of portions of the video conferencing system showing additional detail of the first video conference endpoint, according to one embodiment.

FIG. 1B is a close-up diagram of portions of the video conferencing system 100 showing additional detail of the first video conference endpoint 101A, according to one embodiment. The additional details shown for the first video conference endpoint 101A can also equally apply to the second video conference endpoint 101B shown in FIG. 1A.

FIG. 1B shows additional detail of the controlling device 120. The controlling device 120 includes the first and second processing units $121_1$, $121_2$. Each processing unit $121_1$, $121_2$ can include a processor 121A, a memory 121B, and I/O hardware 121C. Although the processing units $121_1$, $121_2$ shown in FIG. 1B are shown as being identical, in some embodiments the processing units $121_1$, $121_2$ can include different memory, processors, I/O hardware and/or other components (not shown), so that each processing unit $121_1$, $121_2$ can be better suited to execute the tasks assigned to that processing unit $121_1$, $121_2$. Furthermore, in some embodiments, the processing units $121_1$, $121_2$ may be replaced with a single processing unit, or controlling processor (not shown). Moreover, in still other embodiments, the processing units $121_1$, $121_2$ may be disposed in different electronic devices (not shown) instead of both being disposed within the controlling device 120. In still other embodiments, one or more of the components of the controlling device 120 (e.g., the processing units $121_1$, $121_2$) may be included in one or more of the camera devices 110, 111.

The processor 121A may include a central processing unit (CPU), a digital signal processor (DSP), and/or application-specific integrated circuits (ASIC), and other useful components. The processor 121A may be used to execute software programs stored in the memory 121B in order to perform various functionalities associated with the video conference system 100. The memory 121B may be any technically feasible type of hardware unit configured to store data. For example, memory 121B could include some form of non-volatile memory, such as a hard disk, a random access memory (RAM) module, a flash memory unit, or a combination of different hardware units configured to store data.

The I/O hardware 121C can include one or more components for enabling the respective processing unit $121_1$, $121_2$ to communicate with one or more of the camera devices 110, 111, the microphone 117, and the opposing video conference endpoint 101A, 101B. For example, the I/O hardware 121C can include one or more of a USB controller or HDMI controller for communicating with one or more of the camera devices 110, 111 and the microphone 117. Furthermore, the I/O hardware 121C can also include one or more wired or wireless network interface controllers for communicating with the electronic display device 105, the opposing video conference endpoint 101A, 101B, and the cloud services 170, 175, 180 on the network 106.

FIG. 1B also shows additional detail of the electronic display device 105. The electronic display device 105 allows the users to view and hear the incoming primary video conference stream coming from the opposing endpoint 101A, 101B as well as send commands to adjust the primary video conference stream that is being sent from the opposing endpoint 101A, 101B. The electronic display device 105 can be used to run a video conference application 154, which can provide the primary video conference stream 155 to the users 102A at the first video conference endpoint 101A as well as provide one or more preview images 156 showing non-selected views of the opposing video conference endpoint 101B. As shown, the primary video conference stream 155 shows two of the users 102B from the second video conference endpoint 101B.

Figure 2A:
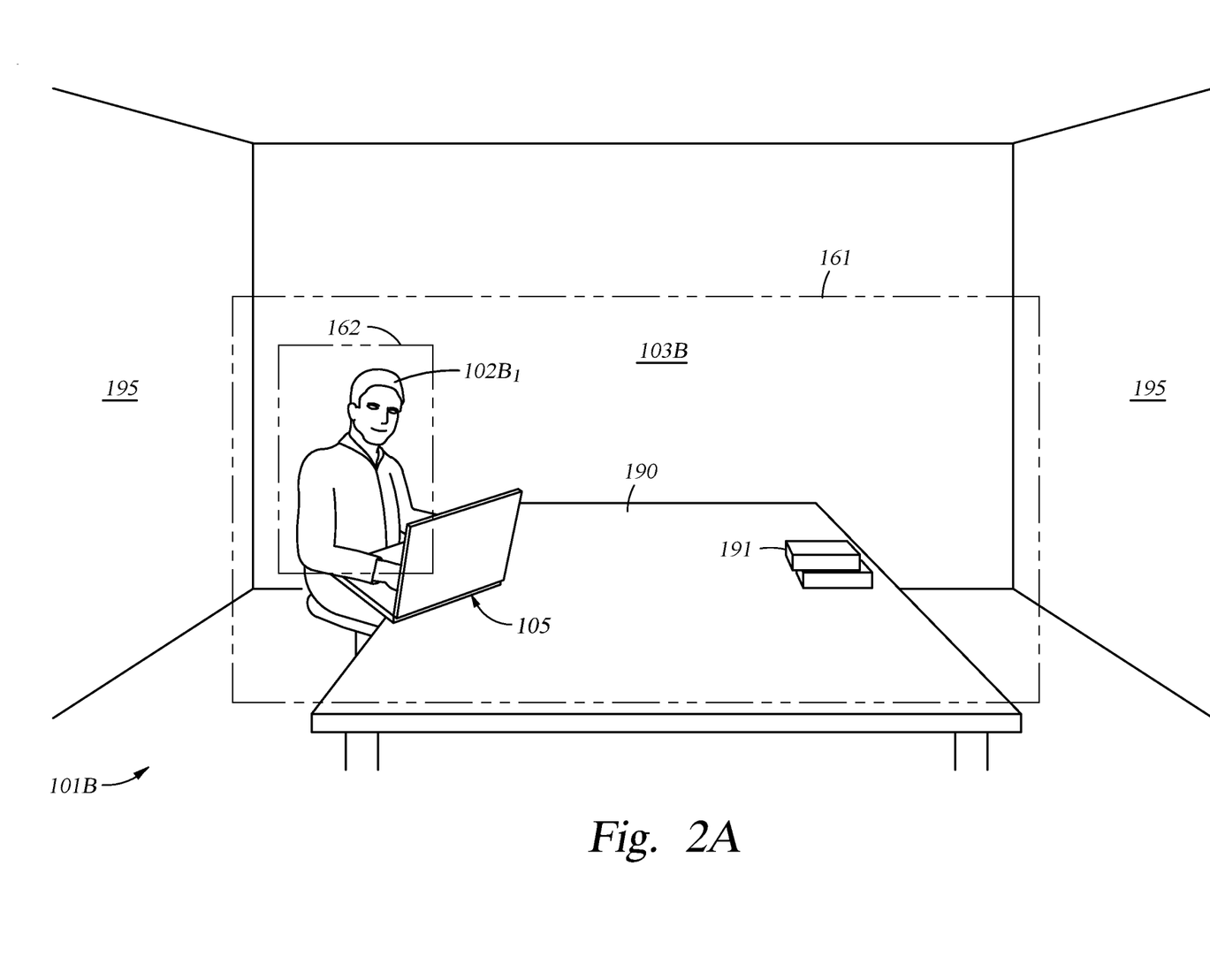
FIG. 2A is a diagram showing views recorded by the camera devices of the second physical environment of the second video conference endpoint, according to one embodiment.

FIG. 2A is a diagram showing exemplary views recorded by the camera devices 110, 111 of the second physical environment 103B of the second video conference endpoint 101B, according to one embodiment. The views in FIG. 2A may be taken at a first time when, for example, a first user $102B_1$ has arrived at a table 190 in the second physical environment 103B. In this exemplary view, the electronic display device 105 is located on the table 190 in front of the user $102B_1$ and two books 191 are also located on the table 190. At the first time, the wide-angle camera device 110 (FIG. 1A) records a first view 161 that is slightly larger than the table 190 and the first user $102B_1$. The first view 161 does not record the unused empty space 195. In some embodiments, the wide-angle camera device 110 can be configured to automatically adjust its view so that the wide-angle camera device 110 does not record a significant amount of empty space, such as the empty space 195. By not recording empty space 195, a more relevant image or video conference stream can be sent to the opposing video conference endpoint 101A enhancing the user's experience at the opposing endpoint 101A. Additionally, at the first time, the pan and tilt camera device 111 (FIG. 1A) records a second view 162 of the first user $102B_1$. In some embodiments, the pan and tilt camera device 111 can be configured to focus on a user's face when there is only one user 102B located within the respective physical environment 103B. The second view 162 can also coincide with a preview image extracted from the first view 161. The preview image can be sent to the electronic display device 105 at the opposing endpoint 101A, so that the users 102A at the first endpoint 101A can use this available preview image to select this alternative view. In some embodiments, the second view 162 can be selected by the processor 121A of the processing unit $121_2$ at the second video conference endpoint 101B based on detected movement within the field of view of the first view 161 or triangulation of sound received by microphones 117 found at the second video conference endpoint 101B. In some embodiments, the second view 162 can be selected by the processor 121A of the processing unit $121_2$ at the second video conference endpoint 101B based on a thermal signature (e.g., detected human body or skin) that is determined from a thermal image collected by one of the camera devices, as will be discussed further below.

Figure 2B:
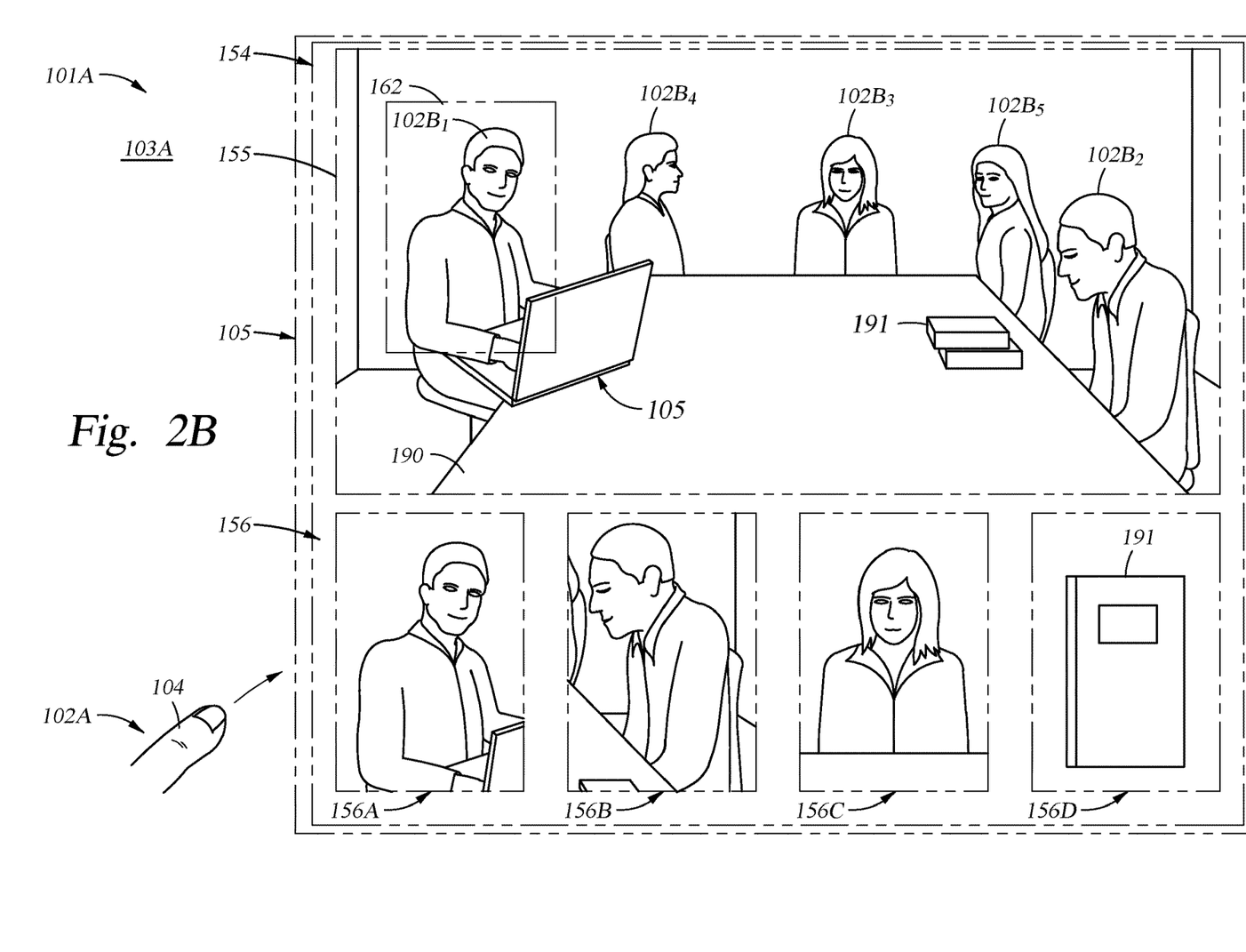
FIG. 2B is a diagram showing exemplary contents of the video conference application when executed in the first physical environment of the first video conference endpoint, according to one embodiment.

FIG. 2B is a diagram showing exemplary contents of the video conference application 154 when executed in the first physical environment 103A of the first video conference endpoint 101A, according to one embodiment. The view in FIG. 2B is taken at a second time that is after the first time. The exemplary contents of the video conference application 154 can include the primary video conference stream 155 and a plurality of preview images 156A-156D from the second video conference endpoint 101B. Although four preview images 156A-156D are shown, in some embodiments more or less preview images 156 may be shown. The primary video conference stream 155 shows five users $102B_{1-5}$ seated around the table 190. Thus, four additional users $102B_{2-5}$ have arrived since first time shown in FIG. 2A. Because the primary video conference stream 155 shows the view of all of the users $102B_{1-5}$ (i.e., an overview), the primary video conference stream 155 may be streamed from the wide-angle camera device 110 or the pan and tilt camera device 111. In some embodiments, when an overview is streamed as the primary video conference stream 155 to the opposing endpoint 101A, both camera devices 110, 111 may record a substantially similar view. For example, if the wide-angle camera device 110 is maintained to focus on an overview image and the pan and tilt camera device 111 is used as the primary video conference stream 155, then both camera devices 110, 111 will record a substantially similar view when an overview is streamed to the opposing endpoint 101A.

The preview images 156A-156D include a first preview image 156A of the first user $102B_1$, a second preview image 156B of the second user $102B_2$, a third preview image 156C of the third user $102B_3$, and a fourth preview image 156D of the books 191. Although not shown, the preview images 156 may also include preview images of the fourth user $102B_4$ and the fifth user $102B_5$. The preview images 156 may also include images of other objects within the second physical environment 103B of the second video conference endpoint 101B, such as the whiteboard 115 (FIG. 1A). Furthermore, in some embodiments the preview images can include images of data received from the auxiliary cloud server 176, such as an image linking to instant messaging applications, screen sharing applications, or electronic document sharing applications. A user 102A in the first physical environment 103A of the first video conference endpoint 101A may change the primary video conference stream 155 streamed to the electronic display device 105 of the first video conference endpoint 101A by selecting one of the preview images 156 shown on the electronic display device 105. For example, in one embodiment in which the electronic display device 105 includes a touchscreen, the user 102A may select one of the preview images 156 with the user's finger 104 to begin streaming the view shown in the selected preview image 156 to the electronic display device 105 of the first video conference endpoint 101A. The user 102A in the first physical environment may also make other adjustments to the incoming primary video conference stream or to the incoming preview images by transmitting commands to pan, tilt, or adjust the zoom of one or more of the camera devices 110, 111 or to adjust the view that is being used to generate a preview image, such as by expanding or contracting the view or moving the view in one or more directions. In some embodiments, the user 102A can accomplish these adjustments using the functionality of a touchscreen device (e.g., pinch to zoom), through use of a pointing device (e.g., mouse or stylus), or through use of another input device included or connected to the electronic display device 105, such as keyboard.

Figure 3:
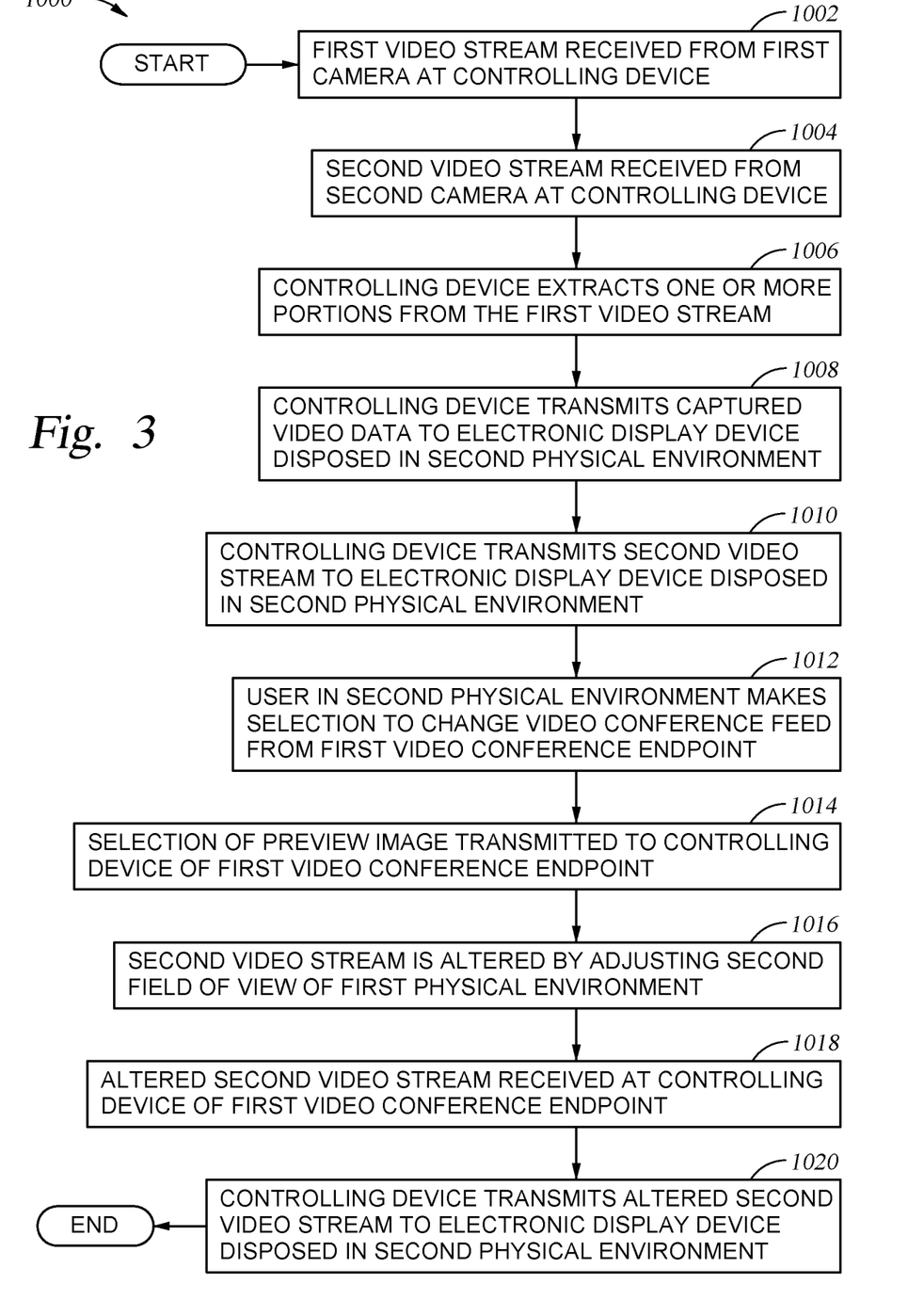
FIG. 3 is a process flow diagram of a method for adjusting the view of the primary video conference stream streamed to the first video conference endpoint, according to one embodiment.

FIG. 3 is a process flow diagram of a method 1000 for viewing the primary video conference stream 155 and then adjusting the view of the primary video conference stream 155 streamed to the second video conference endpoint 101B, according to one embodiment. Referring to FIGS. 1A-1B, 2A-2B and 3, the method 1000 is described.

At block 1002, a first video stream is received from the wide-angle camera device 110 (first camera) at the controlling device 120 of the first video conference endpoint 101A. The wide-angle camera device 110 has a first field of view of the first physical environment 103A to generate the first video stream. The first video stream can be a video stream showing an overview of the first physical environment 103A (e.g., similar to the first view 161 shown in FIG. 2A of the second physical environment 103B).

At block 1004, a second video stream is received from the pan and tilt camera device 111 at the first controlling device 120 of the first video conference endpoint 101A. The pan and tilt camera device 111 has a second field of view of the first physical environment 103A to generate the second video stream. The second video stream can be a video stream that is focused on a portion of the first physical environment 103A, such as being focused on a single user (e.g., similar to the second view 162 shown in FIG. 2A). However, in some embodiments, the second video stream may also be a video stream of an overview (e.g., similar to the first view 161 shown in FIG. 2A of the second physical environment 103B). Thus, in some instances, both camera devices 110, 111 can record a substantially similar video stream.

Although generating the second video stream is largely described herein as being generated by a second camera device 111, in some embodiments the first and second video streams may both be generated from a video stream provided by a camera device. For example, in one embodiment, the wide-angle camera device 110 may record an overview to generate the first video stream, and then the controlling device 120, or the wide-angle camera device 110, can be configured to generate the second video stream from a portion of the first video stream, such as by performing a digital zoom on one area of the first video stream (e.g., zooming in on one of the users).

At block 1006, the controlling device 120 extracts one or more portions from the first video stream. The one or more extracted portions will generally include a plurality of extracted portions. The extracted portions can include the preview images 156 (see FIG. 2B) that are transmitted to the opposing video conference endpoint 101B and displayed on one or more electronic display devices 105 of that endpoint 101B. The preview images 156 can include, for example, images of individual users attending the video conference. The extracted portions from the first video stream can include still images, video, modified still images, or modified video, and can be collectively referred to as captured video data. Modified still images may include picture thumbnails that have a reduced image quality relative to the images recorded by the wide-angle camera device 110. Although still images may be used, the field-of-view or subject matter of the still images may be updated frequently, such as once every 10 seconds, once per second or a few times per second. However, it may be desirable from a bandwidth perspective for the updates to made at a rate that falls well within the capability of the network that they are transmitted upon (e.g., operational server network links 140A,B) and thus it may be desirable for the updates to be made at a rate such that they are not perceived as a video feed. In some embodiments, the captured video data can include video thumbnails of reduced quality (e.g., reduced image quality) or can include video having a reduced frame rate relative to the first video stream. Thus, the captured video data may include or may be derived from the one or more extracted portions of a video feed. Overall, the captured video data can be transferred to the electronic display device 105 located in the video conference endpoint 101B at a much lower data transfer rate than the primary video conference stream, so that more of the bandwidth is available for exchanging the primary video conference streams between the video conference endpoints 101A, 101B. For example, in some embodiments, the data transfer rate of the captured video data to the second physical environment 103B via the first communication link (i.e., through the operational cloud server 181) is less than about 5% to less than about 25% of the data transfer rate of the primary video conference stream to the second physical environment 103B, such as between about 10% and about 25%, or even about 10% of the data transfer rate of the primary video conference stream to the second physical environment 103B.

The captured video data can include a first preview portion (e.g., preview image 156A of FIG. 2B) that includes at least a first portion of a frame of the first video stream (a portion of the first view 161 of FIG. 2A). Similarly, the captured video data can include a second preview portion (e.g., second preview image 156B of FIG. 2B) that includes at least a second portion of the frame of the first video stream. The first preview portion (e.g., first preview image 156A of FIG. 2B) and the second preview portion (e.g., second preview image 156B of FIG. 2B) can be views of different areas of the first physical environment 103A. The captured video data can further include an overview preview portion (not shown) that includes at least a third portion of the frame of the first video stream, where the overview preview portion includes the first preview portion (e.g., first preview image 156A of FIG. 2B) and the second preview portion (e.g., second preview image 156B of FIG. 2B). Although not shown, an overview preview portion could be a preview image similar to the image shown as the primary video conference stream 155 shown in FIG. 2B showing all of the users in the second physical environment 103B. The overview preview image can be a still image, a thumbnail picture or video, or a video provided at a reduced frame rate.

Each video conference endpoint 101A, 101B may further be configured to generate a preview portion for each user located within a field of view of one of the camera devices, such as the wide-angle camera device 110. In one embodiment, the wide-angle camera device 110 or the controlling device 120 may include face detection software to aid in generating the preview images for each user. In another embodiment, one or more sensors may be used to detect body heat emanating from one of the users at a given endpoint 101A, 101B to aid in selecting and generating the preview images for each user in that endpoint 101A, 101B. For example, in one embodiment, one or more infrared sensors (e.g., camera device) can be used to collect an infrared image of a given endpoint 101A, 101B. In one embodiment, upon determining that two or more users 102A are located within the first field of view of the first physical environment 103A (i.e., the view captured by the wide-angle camera device 110), the wide-angle camera device 110 or the controlling device 120 can generate a preview image for each user that includes the face of the user for which the preview portion was generated. Furthermore, in one embodiment, a new preview image can be generated upon determining that a new user has appeared within the first field of view of the first physical environment 103B, wherein the new preview image displays a face of the new user. Thus, in such embodiments, the users at the remote video conference endpoint 101B can select a preview image of every user in attendance at the local video conference endpoint 101A, so that the primary video conference stream can be changed to view any user in attendance at the local video conference endpoint 101A. In some embodiments, the preview images can be generated and selected based on detected changes (e.g., movement of an object or portions of a person's face) in subsequent frames provided within a video stream received from a camera device, or by an analysis of other types of information received by the processor, such as sound received by multiple microphones found within the environment at the endpoint location. The generated and selected images may be created by an analysis of the incoming video stream by use of a processor (e.g., processor 121A within the processing units 121₁, 121₂) of the controlling device 120.

At block 1008, the controlling device 120 transmits the captured video data (e.g., preview images 156, such as picture thumbnails or video thumbnails) to one or more electronic display devices 105 disposed within the second physical environment 103B that is remote from the first physical environment 103A. The captured video data can be transmitted using a first communication link through the operational cloud server 181 (FIG. 1A), for example, using the first operational server network link 140A and the fourth operational server network link 140D. The one or more electronic display devices 105 in the second physical environment 103B that receive the captured video data can display the captured video data to the users 102B in the second physical environment. For example, the captured video data may be displayed similarly to the preview images 156A-156D shown in FIG. 2B. In some embodiments, the transmitting or receiving controlling device 120 can adjust the sequence of preview images 156 that are displayed to the users. For example, in one embodiment, the transmitting or receiving controlling device 120 can arrange the preview images 156 in order of relevancy, such as by placing the most recently selected preview images at the beginning of a list of preview images 156 (e.g., the list of preview images 156A-156D shown in FIG. 2B). In some cases, the software programs running on the receiving controlling device 120 may automatically select and prioritize preview images 156 based on one or more predefined parameters. In one example, the predefined parameters may include camera orientation preferences, quality of the image, information based on determining which of the meeting participants recently spoke, detection of movement, room configuration information or other useful parameters. In some embodiments, preview images 156 that are positioned towards the end of the list may not be displayed by the receiving electronic display device 120 or alternatively may not be transmitted by the controlling device 120 of that video conference endpoint 101A, 10B.

At block 1010, the controlling device 120 transmits the second video stream (e.g., the primary video conference stream recorded by the pan and tilt camera device 111) to at least one of the one or more electronic display devices 105 disposed within the second physical environment 103B. The second video stream can be transmitted using a second communication link through the video conference node 171 (FIG. 1A), for example, using the first, second, and fourth video conference network links 130A, 130B, 130D. The one or more electronic display devices 105 in the second physical environment 103B that receive the second video stream can display the second video stream to the users 102B in the second physical environment 103B. For example, the second video stream may be displayed similarly to the primary video conference stream 155 shown in FIG. 2B. In some embodiments, the second video stream (e.g., primary video conference stream 155) and one of the preview images 156 are of the same views of the first physical environment 103A. For example, the second video stream being used as the primary video conference stream 155 may be an overview of the first physical environment 103A and one of the preview images may be an image of the overview of the first physical environment 103A.

In some embodiments, the controlling device 120 can perform image processing on the captured video data (e.g., preview images 156, such as picture thumbnails or video thumbnails) and/or the second video stream (e.g., the primary video conference stream) before transmitting the captured video data (block 1008) or the second video stream (block 1010) to the one or more electronic display devices 105 disposed within the second physical environment 103B. In one embodiment, the controlling device 120 analyzes the image from the wide-angle camera device 110, which may be recording an overview of the first physical environment 103A, to make adjustments (e.g., color balance, brightness, contrast, sharpness, tint, hue) to one or more of the captured video data and the second video stream. For example, the controlling device 120 may analyze an overview image of the first physical environment 103A to determine that there are multiple light sources or darker portions of the first physical environment 103A relative to other portions of the first physical environment 103A that can reduce the image quality and thus make some portions of the overview image less clear to a user. Based on this analysis, the controlling device 120 can then perform one or more image processing techniques to analyze and make adjustments to one or more portions of the overview or other generated video data (e.g., second video stream from the pan and tilt camera device 111), so that more uniform, higher quality and consistent images may be used to develop the captured video data (e.g., the preview images 156A-156D), or in some cases to transmit more uniform, higher quality and consistent video images in the second video stream. The one or more image processing techniques may include a process where one or more forms of signal processing is performed on an image, a series of images, or a video (e.g., video frame) so that the output of the image processing technique may be either be an altered image or information about a set of characteristics of the analyzed image(s) can be used by the controlling device 120 to adjust attributes of subsequent video data delivered from a camera device. In some configurations, the image processing technique includes the use of an analog and/or a digital signal processing technique to analyze attributes of one or more images. In one example, a digital signal processing technique is used to determine attributes of a two dimensional signal that represents an image within the captured video data or the second video stream. In one embodiment, the controlling device 120 can use the analysis of the overview image from the wide-angle camera device 110 to make adjustments to current or future captured video data, for example to at least one of the preview images 156A-156D, that is transmitted to the one or more electronic display devices 105 disposed within the second physical environment 103B. In some embodiments, the controlling device 120 can use the analysis of the overview image from the wide-angle camera device 110 to make adjustments to the current or future video stream received from the pan and tilt camera device 111 before the video stream from the pan and tilt camera device 111 is transmitted to the one or more electronic display devices 105 disposed within the second physical environment 103B. The image processing performed by the controlling device 120 can enhance the user's experience of using the video conference system 100 because more uniform and consistent images and video streams can be exchanged between the video conference endpoints 101A, 1016. Thus, users can receive higher quality images and/or not be distracted by a received image when previewing and selecting different preview images 156.

At block 1012, a user 102B in the second physical environment 103B makes a selection to change the view of the primary video conference stream 155 from the first video conference endpoint 101A by using one of the one or more electronic display devices 105 disposed in the second physical environment 103B. For example, a user 102B in the second physical environment 103B may select one of the preview images 156, such as by touching the preview image displayed on one of the one or more electronic display devices 105 that includes a touchscreen, by selecting the preview image 156 with a pointing device, such as mouse or stylus, or by some other useful means. In some embodiments, the user 102B may also choose to adjust the selected view by panning, tilting or adjusting the zoom of the selected view. The video conference application 154 may include functionality (not shown) for allowing the user 102B to enter commands on the electronic display device 105 disposed in the second physical environment 103B to pan, tilt, or adjust the zoom of the view currently being streamed to the electronic display device 105 disposed in the second physical environment 103B. In some embodiments, an automatic mode can be enabled allowing the transmitting or receiving controlling device 120 to automatically select the primary video conference feed. For example, in one embodiment, the controlling device 120 of a given endpoint 101A, 101B can use one or more sensors (e.g., cameras and microphones) to determine which user at that endpoint 101A, 101B is currently speaking, and then select the preview image for that user to transmit as the primary videoconference stream. In another embodiment, a semi-automatic mode can be enabled in which the transmitting or receiving controlling device 120 can make a suggestion instead of a selection, for example by notifying the users at the remote location that it may be desirable for the user to select a particular preview image (e.g., the preview image of a current speaker), such as by highlighting the particular preview image or otherwise communicating to the users at the remote location which preview image to select.

At block 1014, the selection of one of the preview image 156 may be transmitted to the controlling device 120 of the first video conference endpoint 101A through the operational cloud server 181 using the fourth and first operational server network links 140D, 140A. However, the preview images 156 may be transmitted to the controlling device 120 of the first video conference endpoint 101A across other available communication path ways, such as across the first and second auxiliary data network links 177A and 177B. In one example, the user's input received in block 1012 causes a camera control command to be sent from the electronic display device 105 to the controlling device 120 at the first physical environment 103A, over the operational server network links 140D and 140A, to change the view provided in the primary video conference stream 155 that is provided to the second physical environment 103B.

At block 1016, in some embodiments, the second video stream (e.g., the video stream recorded by the pan and tilt camera device 111) is altered by adjusting the second field of view of the first physical environment 103A (e.g., the field of view of the pan and tilt camera device 111) based on the selection of the preview image 156 of the first captured video data made by the user 102B located in the second physical environment 103B. The second altered video stream can be generated by the pan and tilt camera device 111 having a third field of view of the first physical environment 103A. Furthermore, the second altered video stream can be generated by the pan and tilt camera device 111 after one or more of panning, tilting, or adjusting the zoom of the pan and tilt camera device 111 after generating the second video stream (i.e., the video stream transmitted to the electronic display device 105 of the second video conference endpoint 101B described above in block 1010). In some embodiments, the controlling device 120 may receive locational information for the newly selected view at this point in time from the wide-angle camera device 110 and then use that locational information for instructing the pan and tilt camera device 111 for recording the newly selected view. Although generating the newly selected view is largely described as being completed by the pan and tilt camera device 111, in some embodiments, generating the newly selected view can be performed by the camera device 110, for example when the camera device 110 includes pan, tilt, and/or zoom functionality or when the newly selected view is the overview that the wide-angle camera device 110 is already recording. In some configurations, the first processing unit $121_1$ of the controlling device 120 is used to relay the information provided from the electronic display device 105 to one of the camera devices 110 or 111 so that one or more software applications running on the camera devices 110 or 111 can be used to alter or adjust the field of view provided by the desired camera device. The provided information (e.g., camera control commands) can be generated by the electronic display device 105 based on the user's selection of the preview image 156. In other configurations, one or more software applications running on the first processing unit $121_1$ of the controlling device 120 are used to generate and send camera control commands to either of the camera devices 110 or 111 so that the controlling device 120 can control the altered or adjusted the field of view provided to the second physical environment 103B.

In some embodiments, at block 1016, the altered video stream provided to the second physical environment 103B is generated by a processor within the controlling device 120 from data found in a video stream received from one or more of the camera devices 110, 111. In this case, the field of view of the one or more camera devices 110, 111 need not be changed to form the altered video stream, since the adjusted field of view is parsed from the data received in the video stream(s) received by a processor disposed within the controlling device 120. For example, the processor within the controlling device 120 can be used to analyze and select portions of one of the video streams provided by one of the camera devices 110, 111, so that the portions of the video streams can then be delivered to the second physical environment 103B, and no separate signals or control of the camera devices 110, 111 are required to be performed by the controlling device 120. The generated altered video stream, which is taken from a portion of the received video stream, is based on the selection of the preview image 156 of the first captured video data made by the user 102B located in the second physical environment 103B.

At block 1018 the altered second video stream transmitted via the video conference network links 130A and 130B is received at the controlling device 120 similarly to how the second video stream was received at the controlling device 120 described above in reference to block 1004.

At block 1020, the controlling device 120 transmits the altered second video stream (i.e., the video stream of the newly selected view) to at least one of the one or more electronic display devices 105 disposed within the second physical environment 103B. The altered second video stream can be transferred using the second communication link through the video conference node 171 (FIG. 1A), for example, using the first, second, and fourth video conference network links 130A, 130B, 130D. The electronic display devices 105 in the second physical environment 103B that receive the altered second video stream can display the altered second video stream to the users 102B in the second physical environment 103B. For example, the altered second video stream may be displayed similarly to the primary video conference stream 155 shown in FIG. 2B.

While the foregoing is directed to embodiments of the present disclosure, other and further embodiments of the disclosure may be devised without departing from the basic scope thereof, and the scope thereof is determined by the claims that follow.

What is claimed is:

1. A video conferencing system comprising a controlling device and one or more cameras, wherein the one or more cameras are configured to view a first physical environment and the controlling device is configured to:
receive a first video stream of the first physical environment from one of the one or more cameras;
extract one or more portions from the first video stream;
transmit first captured video data via a first communication link to one or more electronic devices disposed within a second physical environment that is remote from the first physical environment, wherein the first captured video data includes or is derived from the one or more extracted portions and the first captured video data includes
a first preview portion that includes at least a first portion of a first frame of the first video stream, and
a second preview portion that includes at least a second portion of the first frame of the first video stream, wherein the first preview portion and the second preview portion are views of separate areas of the first physical environment; and
transmit a second video stream of the first physical environment to at least one of the one or more electronic devices disposed within the second physical environment via a second communication link, wherein the second video stream is generated in response to a selection of the first preview portion of the first captured video data in the second physical environment.

2. The video conferencing system of claim 1, wherein the first captured video data includes an overview preview portion that includes at least a third portion of the first frame of the first video stream, wherein the overview preview portion includes the first preview portion and the second preview portion.

3. The video conferencing system of claim 1, wherein the first captured video data comprises one or more still images.

4. The video conferencing system of claim 1, wherein the first captured video data comprises video, and
a data transfer rate of the first captured video data to the second physical environment via the first communication link is 10% or less than a data transfer rate of the second video stream to the second physical environment.

5. The video conferencing system of claim 1, wherein the first captured video data includes video thumbnails or picture thumbnails of two or more locations in the first physical environment.

6. The video conferencing system of claim 1, wherein the first video stream is generated by a first camera of the one or more cameras, the first camera having a first field of view of the first physical environment, and
the second video stream is generated by a second camera of the one or more cameras, the second camera having a second field of view of the first physical environment.

7. The video conferencing system of claim 6, wherein the second video stream is generated by the second camera after one or more of panning, tilting, or adjusting a zoom of the second camera.

8. The video conferencing system of claim 1, wherein the first video stream is generated by a first camera of the one or more cameras, the first camera having a first field of view of the first physical environment, and
the second video stream is generated from a portion of the first video stream.

9. The video conferencing system of claim 8, wherein the second video stream and the first preview portion are of the same views of the first physical environment.

10. The video conferencing system of claim 1, wherein the one or more extracted portions includes a plurality of extracted portions, and
the controlling device is further configured to generate a preview portion for each user located within a first field of view of the first physical environment upon determining that two or more users are located within the first field of view of the first physical environment, wherein each generated preview portion displays a face of the user for which the preview portion was generated.

11. The video conferencing system of claim 10, wherein the controlling device is further configured to generate a new preview portion upon determining that a new user has appeared within the first field of view of the first physical environment, wherein the new preview portion displays a face of the new user.

12. The video conferencing system of claim 1, wherein the controlling device is further configured to alter at least a portion of the first captured video data or the second video stream based on an analysis of the first video stream, wherein the analysis of the first video stream comprises performing an image processing technique on the first portion of the first frame of the first video stream.

13. A video conferencing system, comprising a first controlling device, a first camera and a second camera, wherein the first controlling device is configured to:
receive a first video stream from a first camera, wherein the first camera has a first field of view of a first physical environment;
receive a second video stream from a second camera, wherein the second camera has a second field of view of the first physical environment;
extract one or more portions from the received first video stream;
transmit first captured video data via a first communication link to one or more electronic devices disposed within a second physical environment that is remote from the first physical environment, wherein the first captured video data includes or is derived from the one or more extracted portions and the first captured video data includes a first preview portion that includes at least a first portion of a frame of the first video stream;

transmit the second video stream to at least one of the one or more electronic devices disposed within the second physical environment via a second communication link;

receive a first command, wherein the first command is derived from a selection of the first preview portion of the first captured video data in the second physical environment;

alter the second video stream based on the received first command; and transmit the altered second video stream to at least one of the one or more electronic devices disposed within the second physical environment via the second communication link.

14. The video conferencing system of claim 13, wherein the first captured video data includes a second preview portion that includes at least a second portion of the frame of the first video stream, wherein the first preview portion and the second preview portion are views of different areas of the first physical environment.

15. The video conferencing system of claim 14, wherein the first captured video data includes an overview preview portion that includes at least a third portion of the frame of the first video stream, wherein the overview preview portion includes the first preview portion and the second preview portion.

16. The video conferencing system of claim 13, wherein the first captured video data includes one or more still images.

17. The video conferencing system of claim 13, wherein the first captured video data includes video, and
a data transfer rate of the first captured video data to the second physical environment via the first communication link is 10% or less than a data transfer rate of the second video stream to the second physical environment.

18. The video conferencing system of claim 13, wherein the first captured video data includes video thumbnails or picture thumbnails of two or more locations in the first physical environment.

19. The video conferencing system of claim 13, wherein altering the second video stream, by the first controlling device, based on the received first command further comprises altering at least a portion of the second video stream based on an analysis of the first video stream, wherein the analysis of the first video stream comprises performing an image processing technique on the first portion of the frame of the first video stream.

20. A video conferencing system comprising a first controlling device, a first camera and a second camera, wherein the first controlling device is configured to:
receive a first video stream from the first camera, wherein the first camera has a first field of view of a first physical environment;
receive a second video stream from the second camera, wherein the second camera has a second field of view of the first physical environment;

extract one or more portions from the received first video stream;

transmit first captured video data via a first communication link to one or more electronic devices disposed within a second physical environment that is remote from the first physical environment, wherein the first captured video data includes or is derived from the one or more extracted portions and the first captured video data includes a first preview portion that includes at least a first portion of a frame of the first video stream;

transmit the second video stream to at least one of the one or more electronic devices disposed within the second physical environment via a second communication link;

receive a first command, wherein the first command is derived from a selection of the first preview portion of the first captured video data in the second physical environment;

alter the first video stream by adjusting the first field of view of the first physical environment based on the received first command or alter the second video stream by adjusting the second field of view of the first physical environment based on the received first command; and transmit the altered first video stream or the altered second video stream to at least one of the one or more electronic devices disposed within the second physical environment via the second communication link.

21. A video conferencing system, comprising a controlling device and one or more cameras, wherein the one or more cameras are configured to view a first physical environment and the controlling device is configured to:
receive a first video stream of the first physical environment from one of the one or more cameras;

extract one or more portions from a first video stream of a first field of view of a first physical environment;

transmit first captured video data via a first communication link to one or more electronic devices disposed within a second physical environment that is remote from the first physical environment, wherein the first captured video data includes or is derived from the one or more extracted portions and the first captured video data includes
a first preview portion that includes at least a first portion of a first frame of the first video stream, and
a second preview portion that includes at least a second portion of the first frame of the first video stream, wherein the first preview portion and the second preview portion are views of separate areas of the first physical environment; and transmit the first video stream or a second video stream of a second field of view of the first physical environment to at least one of the one or more electronic devices disposed within the second physical environment via a second communication link, wherein
the first video stream or the second video stream is transmitted in response to a selection of the first preview portion of the first captured video data in the second physical environment.

* * * * *